United States Patent [19]

Miyano et al.

[11] Patent Number: 4,913,732
[45] Date of Patent: Apr. 3, 1990

[54] METHOD FOR SMELTING REDUCTION IN ELECTRIC FURNACE

[75] Inventors: Haruo Miyano; Atsushi Watanabe; Yukio Hongo, all of Tokyo, Japan

[73] Assignee: NKK Corporation, Tokyo, Japan

[21] Appl. No.: 329,675

[22] Filed: Mar. 28, 1989

[30] Foreign Application Priority Data

May 19, 1988 [JP] Japan ................................ 63-123241
Sep. 30, 1988 [JP] Japan ................................ 63-246479

[51] Int. Cl.$^4$ .............................................. C22B 4/00
[52] U.S. Cl. .................................................. 75/10.46
[58] Field of Search ......................................... 75/10.46

[56] References Cited

U.S. PATENT DOCUMENTS 4,200,452  4/1980  Savov ..................................... 75/49
4,212,665  7/1980  Barton ................................... 75/49

*Primary Examiner*—Peter D. Rosenberg
*Attorney, Agent, or Firm*—Frishauf, Holtz, Goodman & Woodward

[57] ABSTRACT

A method for smelting reduction in an electric furnace comprises the steps of forming arc between each electrode of an electric furnace and molten metal in the electric furnace, charging a reducing agent into the electric furnace, blowing inert gas into the molten metal in the electric furnace through each of gas blowing nozzles arranged in the hearth of the electric furnace and feeding powdery material ore into an area, in which the arc is formed. The metal material ore is fed to the arc formation area through a feeding path provided along the center axis of each electrode and having an opening at a lower end of the electrode. The gas blowing nozzles are arranged in position within the range of 200 to 1,000 mm from a pitch circle of each electrode and circumferentially distant by 5° to 25° from a line connecting between a furnace core and the center of the electrode. The metal material ore includes powdery chromium ore. The reducer includes coke, coal and ferrosilicon.

10 Claims, 4 Drawing Sheets

METHOD FOR SMELTING REDUCTION IN ELECTRIC FURNACE

BACKGROUND OF THE INVENTION

1. Field of the Invention

This invention relates to a method for smelting reduction in an electric furnace for smelting and reducing material ores by making use of the heat of arc and, more particularly, to a method for smelting reduction in an electric furnace for smelting and reducing an oxide, which is high in melting point and hard to reduce, with high efficiency and high recovery.

2. Description of the Prior Art

In a prior art method, chromium steel such as high alloy steel and stainless steel has been manufactured as follows. First, a material is smelted in an electric furnace to manufacture molten metal. The molten metal is then decarburized with an argon-oxygen decarburization apparatus or a vacuum oxygen decarburization apparatus so as to obtain the predetermined concentration of carbon. Hereinafter, the argon-oxygen decarburization apparatus will be simply referred to as AOD, while the vacuum oxygen decarburization apparatus will be simply referred to as VOD. Cr is added by a way of charging ferro-chromium, which is an alloy of iron and Cr in an amount of 20 to 60 wt%, into the molten metal. This ferro-chromium is manufactured by the steps of charging lime stone and chromium ore of such oxide that it is hard to reduce and smelt into an electric furnace and then reducing the chromium ore with a reducing agent, into which primary slag smelted by electric power is charged.

However, the prior art method for manufacturing the chromium steel by the use of ferro-chromium involves the following problems.

(a) A great deal of electric energy is necessary to manufacture the ferro-chromium.
(b) It is poor in stirring of molten metal performed by the use of a stirrer after ferro-chromium is charged into the molten metal, thus requiring a lot of time for smelting reduction.
(c) The manufacture of chromium steel becomes extremely high in cost.

SUMMARY OF THE INVENTION

It is an object of the present invention to provide a method for smelting reduction in an electric furnace, which can speedily smelt material ore at low cost.

In order to achieve the above object of the present invention, there is provided a method for smelting reduction in an electric furnace comprising the steps of forming arc between an electrode of an electric furnace and molten metal in the electric furnace, charging a reducing agent into the electric furnace, blowing inert gas into the molten metal in the electric furnace through gas blowing nozzles provided in a hearth of the electric furnace; and feeding powdery material ore to an area, in which the arc is formed.

DESCRIPTION OF THE PREFERRED EMBODIMENT

Figure 1:
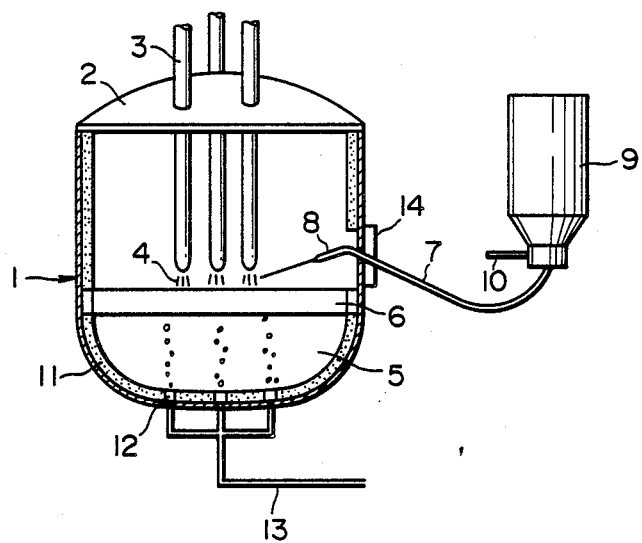
FIG. 1 is a view schematically showing an electric furnace used in a Preferred Embodiment 1.

In accordance with the present invention, powdery chromium ore is fed to an area in which an arc is formed between an electrode of an electric furnace and molten metal in the electric furnace. Since the arc is in the state of being extremely high in temperature as much as 3,000° C., even the chromium ore, which has a high melting point and is hard to reduce, is easily smelted and reduced with a reducing agent which is charged into the electric furnace separately from the chromium ore. In order to speedily reduce the chromium ore, use is preferably made of a powdery or granular reducing agent. The powdery or granular reducing agent includes coke breeze and coal dust. The powdery or granular reducing agent charged into the electric furnace dissolves in the slag and molten metal. Further, since the molten metal is stirred with the inert gas blown into the molten metal, the molten metal, slag, reducing agent and chromium ore come into contact with each other to react together and the chromium ore is reduced with the reducing agent in a short period of time to thereby rise the concentration of chromium contained in the molten metal.

As for a furnace used for decarburization of the molten metal tapped from the electric furnace, use is made of VOD. The decarburization furnace is not limited to VOD and any other decarburization furnace which is usually in use may be available. The molten metal tapped from the electric furnace is decarburized by the use of VOD to thereby manufacture predetermined low carbon steel. In a case when decarburization is performed by the use of VOD, if the molten metal tapped from the electric furnace to VOD is high in carbon concentration, it takes a lot of time for smelting reduction of the molten metal with VOD to thereby reduce the efficiency of VOD. Accordingly, the final concentration of carbon contained in the molten metal in an ordinary electric furnace is preferably 1% or less. In the molten metal with such carbon concentration of 1% or less, the chromium ore which has a high melting point and is hard to smelt is less liable to reduce merely by charging the chromium ore into the molten metal. It depends upon that the chromium ore ±s mainly composed of chromite $(Mg, Fe)O(Cr, Al, Fe)_2O_3$ having a spinel structure. The spinel structure is characterized by having strong bond energy, high melting point, and thermal and mechanical stability. Owing to this spinel structure, the reduction of chromium ore has been considered to be industrially difficult in an electric furnace, so that any chromium ore has not been used for manufacture of chromium steel in the electric furnace.

In accordance with the present invention, powder of chromium ore is blown into an area, in which he arc at extremely high temperature as much as 3,000° C. is formed between the electrode of the electric furnace and the molten metal. Then, the powder of chromium ore is smelted to thereby convert the chromite structural body into individual oxides constituting gangue mineral. The individual oxides include MgO, FeO, $Al_2O_3$, $Cr_2O_3$. The individual oxides are reduced with a reducing agent such as carbon, silicon and aluminium or the like through the medium of slag containing CaO. At the time of reduction, the molten metal is strongly stirred by the action of inert gas blown into the molten metal so as to react the molten metal and chromium ore with each other in a short period of time. The drawback to stirring of molten metal in accordance with a prior art stirrer system may be covered up by means of blowing of gas for the use of stirring. The prior art stirrer system involves such problems that the reaction such as $$(Cr_2O_3)+3C\rightarrow 2Cr+3CO$$

$$2(Cr_2O_3)+3Si\rightarrow 4Cr+3SiO_2 \text{ and}$$

$$2(Cr_2O_3)+2Al\rightarrow 4Cr+2Al_2O_3$$

is slow to prolong the time taken for manufacture of steel and a reduction ratio of chromium ore is small.

PREFERRED EMBODIMENT 1

Hereinafter, a method of the present invention will be explained with reference to the accompanying drawings. FIG. 1 is a view schematically showing an electric furnace used in a Preferred Embodiment 1. Into an electric furnace 1 are vertically inserted three electrodes 3 in the longitudinal direction through a furnace cover 2. First, scrap, alloy steel such as ferrosilicon and flux are charged into the furnace. Three-phase AC voltage is fed from a power supply to each of the electrodes 3. Arc 4 is formed between each electrode 3 and the scrap and then the scrap is smelted with the heat of arc to thereby obtain molten metal 5 and slag 6 on the molten metal. Into the electric furnace 1 is inserted a pipe 7 having a nozzle 8 formed at its tip end and facing to the arc 4 formed between each electrode 3 and the slag 6. The base end of the pipe 7 is connected to a tank 9. Further, the pipe 7 is connected to an inert gas supply source (not shown) through a pipe 10. Powdery chromium ore is stored in the tank 9. Three gas blowing nozzles 12 for blowing gas into the molten metal 5 are attached in brick 11 of the hearth of the electric furnace 1 so as to correspond to the three electrodes 3. To the bottom of each of the gas blowing nozzles 12 is connected an inert gas feeding piping 13 for feeding inert gas such as Ar and $N_2$ from an inert gas feeder (not shown) into the electric furnace.

The flow rate of gas per each gas blowing nozzle 12 may be independently controlled. Use is made of MgO-C as a material of each gas blowing nozzle 12. The gas blowing nozzles 12 are preferably arranged in position within the range of 200 to 1,000 mm from a pitch circle of each electrode 3 in the direction of the furnace wall of the electric furnace 1. Each gas blowing nozzle 12 comprises twenty three fine tubes each made of stainless steel and having a diameter of 1 mm. Each gas blowing nozzle 12 is truncated conical in shape and the whole size on the head side thereof is 80 mm in diameter while that on the bottom side is 130 mm in diameter. The whole length of the gas blowing nozzle is 690 mm.

When chromium steel is manufactured with such apparatus as noted above in accordance with the present invention, the material such as scrap as well as the flux such as lime and silicon are first charged into the electric furnace 1. Three-phase AC voltage is fed to each of the electrodes 3 and the arc is formed between each electrode 3 and the scrap to thereby smelt the material and flux. Then, inert gas is blown in through each of the gas blowing nozzles 12 arranged in the hearth of the electric furnace 1. After the material and flux are completely smelted, calcined lime and ferrosilicon are charged into the electric furnace 1 through a charging door 14. Chromium ore and reducing agent such as coke are fed from the tank 9 at a predetermined speed and then is blown into the arc 4 through the nozzle 8 together with carrier gas. Alternatively, the reducing agent may be charged separately from the chromium ore into the electric furnace without mixing the reducing agent with the chromium ore stored in the tank 9. In this case, the reducing agent may be blown into the arc or into the slag. Inert gas adapted for stirring the molten metal 5 is blown in through each of the gas blowing nozzles 12 arranged in the hearth of the electric furnace 1 while the chromium ore is being blown in.

There are following two cases where blown-in chromium ore is presumed to be present in the slag 9 floating on the surface of the molten metal. In the first case, the blown-in chromium ore is mixed with such matters as CaO and $SiO_2$ contained in the slag in the state of a spinel structure called as chromite. In the second case, the spinel structure is decomposed with the heat of arc at a high temperature and a firm chemical bonding of such matters as $Cr_2O_3$ and MgO, $Al_2O_3$, FeO and $Fe_2O_3$ with the chromium ore is broken, thus resulting in such state that the chromium ore is mixedly being smelted together with such matters as CaO and $SiO_2$ contained in the slag 6. In either case, immediately after the chromium ore is blown in, the chromium ore is present in the slag 6 which is in the non-reduced state, i.e., in the state of $Cr_2O_3$. In order to migrate the chromic content into the molten metal by efficiently reducing $Cr_2O_3$ in a slag 6, a powdery slag regulating agent is blown into the slag 6 or toward the surface of the slag 6 while the chromium ore is blown in as well as ferrosilicon is charged into the molten metal immediately after the completion of blowing of the chromium ore. Even in the reducing period, the reduction reaction is facilitated by means of stirring of molten metal and slag with bottom blowing gas.

Further, in order to make up for a deficiency of reduction reaction in the furnace, a small amount of ferrosilicon is charged into a ladle after the molten metal is tapped from the electric furnace into the ladle, and then argon gas is blown in through a porous plug of the ladle for stirring to thereby more efficiently reduce $Cr_2O_3$ remaining in the non-reduced state.

According to the present invention, by feeding the chromium ore to an arc formation area, $Cr_2O_3$ contained in the fed chromium ore melts in the slag with the heat of arc formed between each electrode and the molten metal. $Cr_2O_3$ is directly reduced with C, Al, SiC contained in the slag regulating agent or carbon contained in the coke added. The slag regulating agent is also effective in the following points.

(a) Foaming of slag occurs by the oxidation of carbon. The slag may be entirely activated caused by foaming.

(b) The temperature of slag entirely rises in accordance with the exothermic reaction reduction by Si contained SiC and Al.

(c) Fluidity of slag is improved with addition of $Al_2O_3$, $SiO_2$, $R_2O$(Alkali) and $Na_2AlF_6$ to facilitate the reduction reaction.

EXAMPLE 1

Next, the result that chromium ore was reduced according to the present invention will be explained. Table 1 shows the composition of a slag regulating agent used in Example-1.

TABLE 1

| Metalic Al | SiC | Al$_2$O$_3$ | SiO$_2$ | CaO | R$_2$O | Na$_2$AlF$_6$ | F.C |
|---|---|---|---|---|---|---|---|
| | | | | | | (Unit: wt %) | |
| 20 | 3 | 35 | 5 | 5 | 2 | 3 | 20 |

Tables 2 and 3 show the composition (Wt%) and particle size or the like of chromium ore used in Example-1, respectively.

TABLE 2

| Component Concentration | Cr$_2$O$_3$ | FeO | Al$_2$O$_3$ | MgO | SiO$_2$ |
|---|---|---|---|---|---|
| | 45.14 | 25.0 | 13.71 | 10.48 | 3.54 |
| | CaO | C | P | S | |
| | 0.06 | 0.018 | 0.005 | 0.015 | |

TABLE 3

| Melting point (°C.) | Absolute specific gravity (g/cm$^3$) | Particle size (upper row: mm lower row: %) | | | | |
|---|---|---|---|---|---|---|
| | | $\geq 1$ | 1 ~ 0.5 | 0.49 ~ 0.25 | 0.24 ~ 0.149 | < 0.149 |
| 1850° C. | 4.3 ~ 4.6 | 0.3 | 3.3 | 15.4 | 26.7 | 54.9 |

Smelting Period of Scrap:

For the purpose of preventing chromium in the molten metal from oxidizing during the smelting of scrap, 300 Kg of ferrosilicon was charged. Subsequently, the scrap was smelted.

Blowing period of Ore:

After the smelting of scrap was over, blowing of chromium ore was started. The chromium ore was stored in the tank 9 and inert gas of 4.5 kg/cm$^2$ in pressure was blown in the neighborhood of the arc at a feeding speed of 125 Kg/min for 16 minutes as carrier gas. The flow rate of inert gas corresponds to 400 Kg per molten metal T. On the other hand, a slag regulating agent and coke as a reducing agent were blown in through another tank toward the slag in the furnace at a feeding speed of 22 kg/min for 16 minutes during the blowing period of chromium ore. The blow rate of the reducing agent and slag regulating agent corresponds to 7 Kg per molten metal T. Argon gas was blow into the molten metal through the hearth of the furnace during the blowing period of chromium ore. The blow rate of argon gas to be blown into the molten metal during the blowing period of chromium ore was respectively 70l/min from through gas blowing nozzles.

Reduction period:

Upon completion of the feeding of chromium ore, coke as the reducing agent and slag regulating agent 350 Kg of ferrosilicon was charged into the electric furnace in order to reduce Cr$_2$O$_3$ remaining in the slag in the non-reduced state into the molten metal. The reduction was performed for 33 minutes.

Bubbling period in Ladle:

The molten metal 5 was tapped into a ladle and 100 Kg of FeSi was charged into the ladle during the tapping of molten metal while Ar gas was blown into the molten metal to stir the molten metal in the ladle to thereby make up for a deficiency of reduction of Cr in the electric furnace 1. After the bubbling in the ladle was over, treatment with VOD was performed.

Figure 2:
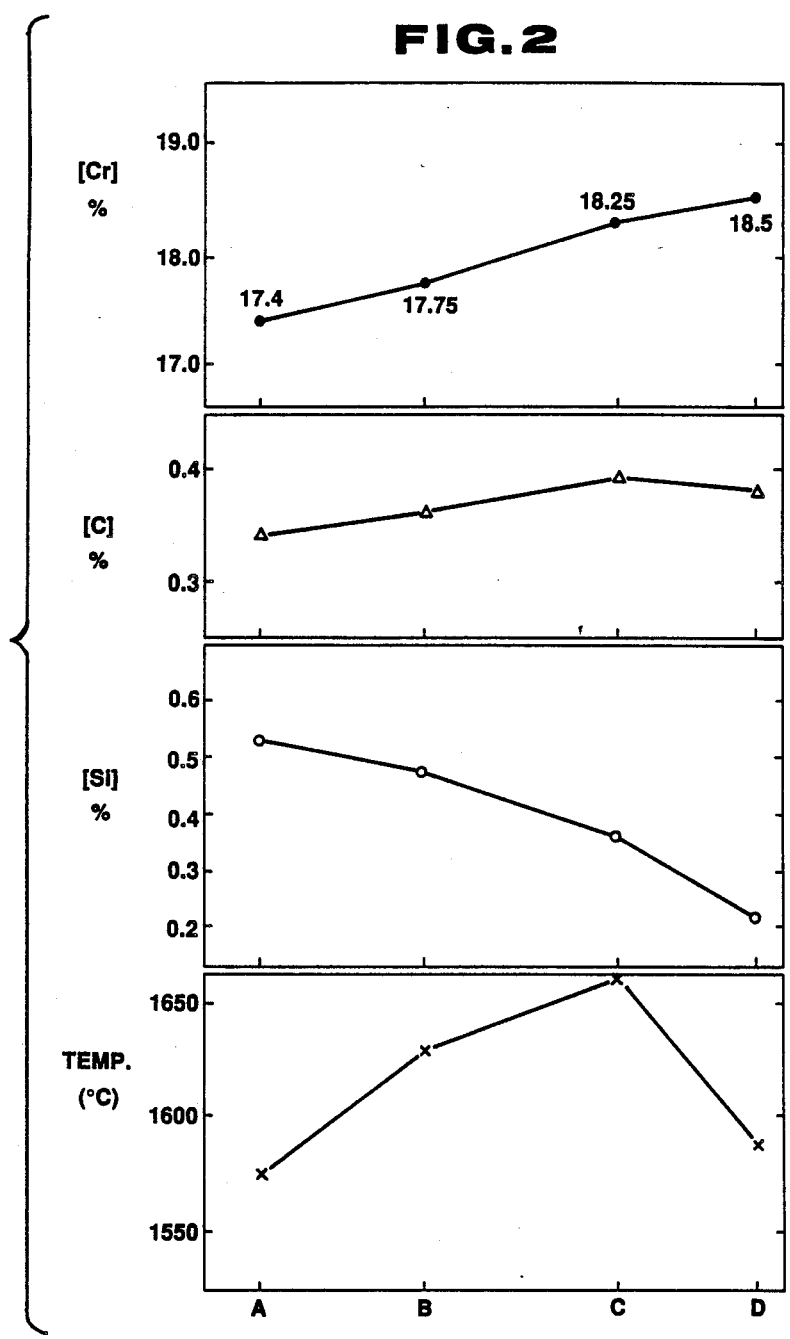
FIG. 2 is a graph showing a variation of each concentration of Cr, C and Si contained in molten metal and that of the temperature of molten metal when chromium ore is reduced.

FIG. 2 shows a variation of each concentration of Cr, C and Si contained in the molten metal and that of the temperature of molten metal when the chromium ore was reduced. A, B, C and D indicated in the graph represent the following periods, respectively.

Figure 3:
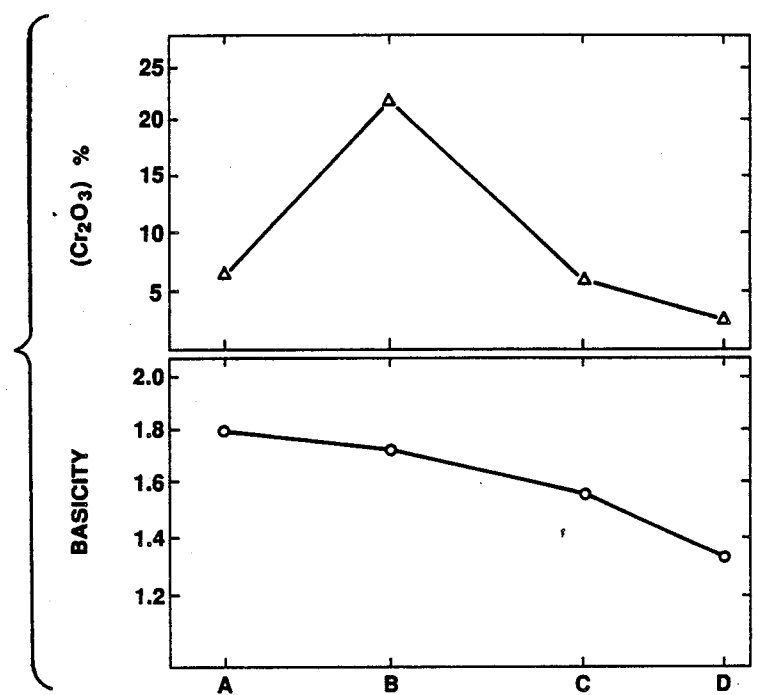
FIG. 3 is a graph showing a variation of the concentration of chromium oxide ($Cr_2O_3$) contained in slag and that of basicity when the chromium ore is reduced.

A: when smelting of scrap is completed to start blowing of chromium ore.
B: when blowing of chromium ore is over.
C: before molten metal is tapped into a ladle, and
D: before the treatment with VOD FIG. 3 shows a graph showing a variation of the concentration of Cr oxide (Cr$_2$O$_3$) in slag and that of basicity when the chromium ore was reduced.

After the blowing of chromium ore and that of slag regulating agent were started, C and Cr contained in the molten metal were gradually increased while Cr$_2$O$_3$ contained in the slag was also gradually increased. However, after the lapse of 33 minutes from a point of time when the blowing of chromium ore was over, Cr$_2$O$_3$ in the slag was rapidly reduced whereas Cr in the molten metal was remarkably increased. This depends upon a fact that Cr$_2$O$_3$ in the slag was reduced with the added ferrosilicon to increase Cr in the molten metal. Accordingly, in the manufacture of chromium steel, the chromium ore was able to reduce with high efficiency without remaining any non-reduced chromium ore in the electric furnace 1. Further, by blowing the inert gas into the molten metal through each of the gas blowing nozzles 12 arranged in the hearth of the electric furnace 1, the molten metal and slag was sufficiently stirred to thereby uniformly disperse the added chromium ore, ferrosilicon and slag regulating agent throughout the electric furnace.

Assuming that a pure quantity of chromium contained in the chromium ore blown in the blowing period is 100, a ratio of the pure quantity of chromium reduced in the slag in each operating step results in as follows.

TABLE 4

| | ratio of pure quantity of reduced chromium | ratio of pure quantity of non-reduced chromium |
|---|---|---|
| B | 29 | 71 |
| C | 71 | 29 |
| D | 92 | 8 |

B: when blowing of chromium ore is over
C: before molten metal is tapped into a ladle, and
D: before the treatment with VOD The pure quantity of chromium was obtained on the basis of transition of each concentration of Cr and Cr$_2$O$_3$ shown in FIG. 2. As is apparent from the table 4, by blowing the chromium ore into the arc area, adding the slag regulating agent and ferrosilicon and simultaneously blowing argon gas into the molten metal through the hearth of the electric furnace, the stirring of molten metal was facilitated to thereby reduce the chromium ore in each step. Further, it comes out that the pure quantity of chromium contained in the molten metal is increased.

Here, the pure quantity ( Kg) of chromium is obtained from the following formula:

quantity ( Kg) of chromium ore to be blown
i×chromium oxide (Cr$_2$O$_3$) in chromium ore ((
Kg)×wt%)×104/152×1/100

EXAMPLE-2

This example utilizes a carbon reducing method for reducing chromium ore with carbon instead of ferrosilicon, as a cheap reducing agent by making use of bottom blow stirring.

It differs from Example-1 in that 10 Kg/ton of carbon was blown into the slag during the blowing period of chromium ore and the reduction time in the reduction period was required double as much as Example-1 since reducing force in the carbon reducing method is weaker than that in the ferrosilicon reducing method.

Table 5 shows a comparison of the ratio of pure quantity of chromium reduced in accordance with Examples 1 and 2 and a prior art method.

TABLE 5

|  | Reduced ratio of pure quantity of chromium (%) |
|---|---|
| Example-1 | 72 |
| Example-2 | 45 |
| Prior Art method | 25 |

In the above prior art method, reduction was performed with carbon and stirring was performed with a stirrer. Further, for comparison, the reduction was performed for 33 minutes as same as those in Example 1 and 2.

The reduced ratio of pure quantity of chromium is calculated by:

{pure quantity (Kg) of reduced chromium / pure quantity (Kg) of chromium of charged chromium ore}×100

As is obvious from Table 5, the reduced ratio of pure quantity of chromium in the present invention was improved about twice or three times as much as that in the prior art method.

Table 6 shows a comparison of time required for reduction in the electric furnace among Examples 1 and 2 and a prior art method.

TABLE 6

|  | Reduction time (min.) |
|---|---|
| Example-1 | 33 |
| Example-2 | 61 |
| Prior art Method | 91 |

Further, for comparison, the reduction time was set to be equal with the time required for obtaining the rate of reduction (72%) as same as that obtained by the reduction with silicon. As is obvious from this table, the reduction time in the present invention was reduced down to $\frac{1}{3}$ to $\frac{2}{3}$ in comparison with that in the prior art method. In other words, the reduction speed in the present invention comes to be twice or three times as much as that in the prior art method.

PREFERRED EMBODIMENT-2

Next will be explained a Preferred Embodiment 2 with reference to FIG. 4.

Figure 4:
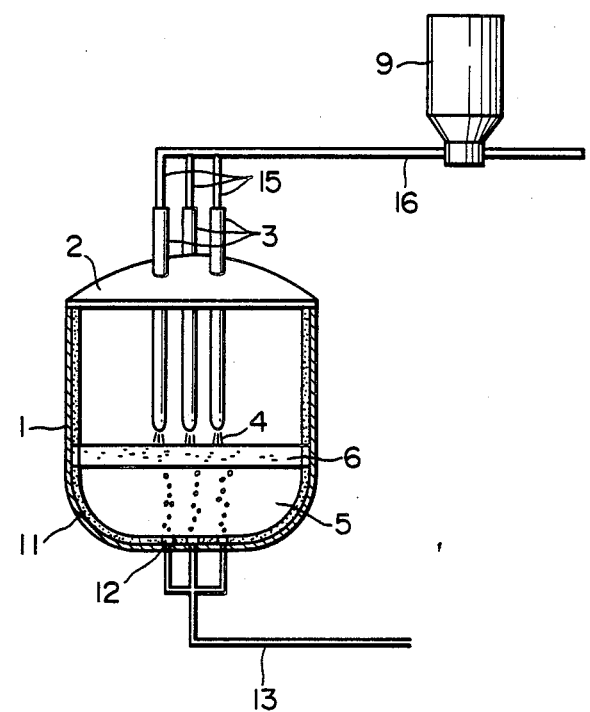
FIG. 4 is a view schematically showing an electric furnace used in a Preferred Embodiment 2.

Referring to FIG. 4, the parts which are the same as those illustrated in FIG. 1 will be provided with the same numbers as those in FIG. 1 to omit the explanation thereof. Each of three electrodes 3 is cylindrical in shape and formed in its center with a powdery chromium ore feeding path (not shown) extending in the longitudinal direction. Each of the paths is connected to a distributing pipe 15 which is connected to a feed pipe 16. This feed pipe 16 is connected to a proper inert gas feeding source (not shown) and provided with a hopper 9. Three gas blowing nozzles 12 for blowing gas into the molten metal 5 are attached in the brick 11 of the hearth of the electric furnace 1 so as to correspond to the three electrodes 3. To the bottom of each of the gas blowing nozzles 12 is connected an inert gas feeding piping 13 for feeding inert gas (Ar, $N_2$) from an inactive gas feeder (not shown) into the electric furnace.

Further, the flow rate of gas per each gas blowing nozzle 12 may be independently controlled. As for a material of each gas blowing nozzle 12, use is made of MgO-C. The gas blowing nozzles 12 are arranged in position within the range of 200 to 1,000 mm from a pitch circle of each electrode 3 in the direction of a furnace wall of the electric furnace 1. Each gas blowing nozzle 12 comprises twenty three fine tubes each having a diameter of 1 mm. Each gas blowing nozzle is truncated conical in shape and the entire size on the head side is 80 mm in diameter while the entire size on the bottom side is 130 mm in diameter The whole length of the gas blowing nozzle is 690 mm.

The chromium ore and reducing agent stored in the hopper 9 are fed from the hopper 9 and blown in toward the arc 4 from a discharge port provided on a lower end of each electrode through the feeding path of each electrode 3 with high-pressure carrier gas. Even in this method, the chromium ore was also able to reduce with high efficiency in the electric furnace.

In the preferred embodiment-2, the gas blowing nozzles 12 were arranged in position within the range of 200 to 1,000 mm from a pitch circle of each electrode 3 in the direction of the furnace wall of the electric furnace 1. More preferably, the gas blowing nozzles are arranged in a hearth section within the range of 200 to 1,000 mm from a pitch circle of each electrode in the direction of the furnace wall and distant by 5° to 25° from a line connecting between a furnace core and each electrode. The arranging position of each gas blowing nozzles is limited for the reasons that raging of molten metal is enlarged to come the molten metal into contact with the electrodes, thus resulting occurrence of abnormal fuse of electrodes to be damaged, if the gas blowing nozzles are arranged in position closer to the furnace core rather than the pitch circle of the electrode. If the gas blowing nozzles are arranged in position to be less than 200 mm from the pitch circle of the electrode in the direction of the furnace wall, the arc of the electrode is fed to each metal fine tube of the gas blowing nozzle during the smelting of scrap, so that the metal fine tube is fused to be damaged and the surface of molten metal swells to thereby abnormally damage the electrodes as being fused. If the gas blowing nozzles are arranged in position to be over 1,000 mm from the circle of the electrode in the furnace wall direction, the stirring of molten metal results in insufficiency. Further, if the gas blowing nozzles are distant to be less than 5° from the line connecting the furnace core of the electric furnace and the electrode, the position of each metal fine tube of the gas blowing nozzle comes to be in the neighborhood right beneath the electrode, so that the arc during turning on electricity is fed to each metal fine tube of the gas blowing nozzle. When the gas blowing nozzles are distant to be over 25° from the line connecting between the furnace core and the electrode, a cold zone (molten metal temperature of which is lower than that of a hot zone) is present in the close proximity of the gas blowing nozzles in this case, so that the molten metal present in the neighborhood of the cold zone becomes poor in fluidity to weaken the stirring of molten metal in this zone.

What is claimed is:

1. A method for smelting reduction of a solid-state material in an electric furnace having electrodes therein, comprising the steps of:
    forming an arc between each electrode of the electric furnace and molten metal in the electric furnace;
    charging a reducing agent into the electric furnace in which the arc is formed;
    blowing inert gas into the molten metal in the electric furnace through gas blowing nozzles arranged in the hearth of the electric furnace, said blown-in inert gas stirring the molten metal in the furnace; and
    feeding a solid-state powdery material ore, as a starting material, to an area in the furnace in which the arc is formed.

2. The method according to claim 1, wherein said step of feeding material ore includes feeding material ore to the arc formation area through a feeding path provided along the center axis of each electrode and having an opening at a lower end of said electrode.

3. The method according to claim 1, wherein said step of feeding material ore includes feeding material ore from a nozzle mounted on a tip end of a pipe inserted into the electric furnace toward the arc formation area.

4. The method according to claim 1, wherein said gas blowing nozzles include gas blowing nozzles arranged in position within the range of 200 to 1,000 mm from a pitch circle of each electrode in the direction of a furnace wall and circumferentially distant by 5° to 25° from a line connecting between a furnace core and the center of the electrode.

5. The method according to claim 1, wherein said material ore includes powdery chromium ore.

6. The method according to claim 1, wherein said step of charging a reducing agent into an electric furnace includes charging a reducing agent to the arc formation area through a feeding path provided along the center axis of each electrode and having an opening at a lower end of said electrode.

7. The method according to claim 1, wherein said reducing agent includes coke.

8. The method according to claim 1, wherein said arc formation area includes a high temperature area in the neighborhood of said arc formation area.

9. The method according to claim 1, wherein said reducing agent includes coal.

10. The method according to claim 1, wherein said reducing agent includes ferrosilicon.

* * * * *